United States Patent
Motegi

(10) Patent No.: US 7,363,542 B2
(45) Date of Patent: Apr. 22, 2008

(54) IMAGE FORMATION APPARATUS AND NETWORK SYSTEM

(75) Inventor: Akihiko Motegi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 409 days.

(21) Appl. No.: 10/409,119

(22) Filed: Apr. 9, 2003

(65) Prior Publication Data

US 2004/0153759 A1 Aug. 5, 2004

(30) Foreign Application Priority Data

| Apr. 16, 2002 | (JP) | ............................. 2002-113950 |
| Jun. 12, 2002 | (JP) | ............................. 2002-172123 |
| Apr. 3, 2003 | (JP) | ............................. 2003-100747 |

(51) Int. Cl.
*G06F 11/00* (2006.01)

(52) U.S. Cl. ..................................................... 714/24

(58) Field of Classification Search .................. 714/24, 714/22; 150/213; 358/1.14
See application file for complete search history.

(56) References Cited

U.S. PATENT DOCUMENTS

| 5,068,853 | A | * | 11/1991 | Soma et al. ................... 714/24 |
| 5,194,879 | A | | 3/1993 | Kotabe et al. |
| 5,610,724 | A | | 3/1997 | Kaneko et al. |
| 5,710,959 | A | * | 1/1998 | Hirooka et al. ............... 399/88 |
| 5,729,268 | A | * | 3/1998 | Akimoto ..................... 347/119 |
| 5,832,301 | A | * | 11/1998 | Yamaguchi ................... 710/48 |
| 6,061,181 | A | * | 5/2000 | Fereidooni ................... 359/625 |
| 6,307,640 | B1 | | 10/2001 | Motegi |
| 6,393,584 | B1 | * | 5/2002 | McLaren et al. .............. 714/14 |
| 6,509,975 | B1 | | 1/2003 | Motegi |
| 6,516,440 | B1 | * | 2/2003 | Teradaira ..................... 714/763 |
| 6,694,453 | B1 | * | 2/2004 | Shukla et al. ................. 714/24 |
| 6,876,469 | B1 | | 4/2005 | Nakamura |
| 6,908,164 | B2 | * | 6/2005 | Gilbert et al. ................. 347/5 |
| 7,028,172 | B2 | * | 4/2006 | Levidow et al. .............. 713/1 |
| 7,107,472 | B2 | * | 9/2006 | Weinold ..................... 713/324 |
| 2006/0007469 | A1 | * | 1/2006 | Uruma ..................... 358/1.14 |
| 2006/0028661 | A1 | * | 2/2006 | Uruma ....................... 358/1.6 |

FOREIGN PATENT DOCUMENTS

| JP | 2000-172348 | 6/2000 |
| JP | 2000-209376 | 7/2000 |

OTHER PUBLICATIONS

U.S. Appl. No. 10/259,330, filed Sep. 30, 2002, Motegi.
U.S. Appl. No. 10/409,119, filed Apr. 9, 2003, Motegi.

* cited by examiner

*Primary Examiner*—Robert Beausoliel
*Assistant Examiner*—Amine Riad
(74) *Attorney, Agent, or Firm*—Oblon, Spivak, McClelland, Maier & Neustadt, P.C.

(57) ABSTRACT

An operation detecting part detects operation of a power switch, and a backup device performs a backup operation enabling a predetermined amount of power supply even after the power switch has cut off the power supply. Upon detection of power cut off by the operation detecting part, while the backup device performs the backup operation, the control part saves predetermined data stored in a volatile storage device in an apparatus externally via a network, or into a non-volatile storage device.

13 Claims, 12 Drawing Sheets

FIG. 7A  AC POWER
FIG. 7B  DC 5V FOR CONTROL
FIG. 7C  COMMAND TRANSMISSION SOFTWARE CONTROL

IMAGE FORMATION APPARATUS AND NETWORK SYSTEM

BACKGROUND OF THE INVENTION

1. Field of the Invention

The present invention relates to an image formation apparatus and a network system containing image formation apparatuses, and, in particular, to an image formation apparatus having a function such that, when a power supply to the image formation apparatus is shut down by an external operation, predetermined information is saved, and, thus, an occurrence of problem due to the event of power supply shut down can be avoided.

2. Description of the Related Art

In an image formation apparatus, such as a copier, a printer or a composite machine which has both of these functions, upon a turning-off operation performed on a power supply switch, the power supply to this machine is cut off completely, and, thus, a power supply to each control part thereof is stopped. That is, when an unexpected power supply turning-off operation by a user occurs, the control function in the machine naturally dies without no recognition thereof is made by a control management part (CPU etc.) of the machine itself. When such a situation occurs in the image formation apparatus which operates under a communications network environment, communications with this image formation apparatus which is acting a terminal of the network are suddenly interrupted. Thereby, this event is regarded as occurring due to a communications failure or a machine trouble.

For example, when a power switch is turned off by an operation of a user during a printing operation is on the way in the image formation apparatus, all the operations of a drive system and a control system stop. In this case, some problem may occur in that, for example, a transfer paper on which a printing operation is being made is left inside of the machine enclosure, a large amount of image data which is currently produced during an image formation preparation process is lost, or the like. Especially, a user normally operates a machine by a remote control manner at a position distant from the machine itself, and, usually, after estimating that a printing operation has been completed, the user goes there to take a printed matter, under a communications network environment. In such a situation, a problem may occur in that, when a power supply to the machine has been shut off by an operation of another user as mentioned above, the above-mentioned printed matter may not have been actually completed without no proper notification of this situation being given due to the sudden power failure in the machine which does not allow the machine to perform such a notification operation.

Further, when such an abnormal interruption in operation of a machine caused by an event of power supply being turned off, and thus, a communications failure in the network occur, since the control operation is interrupted without recognition thereof by the control management unit (CPU or so) of the machine itself, a considerable time may be needed for analyzing this event for the cause thereof, and, thus, a considerable time is needed until the system recovers from this situation.

In order to solve such a problem, a system is demanded in which information indicating that the power switch has been manually turned off is stored as history information. For example, Japanese laid-open patent application No. 2000-172348 discloses a system in which a control power switch is provided other than a main power switch. Thereby, without providing any other special device, power saving can be achieved on an occasion in which the machine is not actually used.

According to this prior art, the control power switch does not directly cut off a power supply from a main commercial power source, and a signal concerning an operation of the switch is monitored. Then, at a time of a turning off operation made by a user is detected; the actual power supply is cut off by means of a predetermined power supply cut off circuit. In this prior art, after detecting the turning off operation of the control power switch, some control processing which is needed with respect to a power shut down event is performed automatically, and turning off of actual power supply is performed after that.

With such a configuration, since an actual power supply shut down event can be recognized beforehand by a control management unit as mentioned above, an abnormal or problematic interruption of the machine can be avoided, and a fact that the operation interruption of the machine has occurred due to a manual turning-off operation performed by a user can be properly notified to the outside through a communications network. Accordingly, a work of analyzing this event for a cause thereof should not be performed However, in this prior art, some problem may occur as will be now discussed. That is, on an occasion of CPU's run-away or an endless heating operation of a fixing heater due to malfunction, although a user thus may wish to shut down the machine immediately, an emergency shut down may not be properly achieved due to the above-mentioned lengthy operation to be performed before an actual power shut down operation.

SUMMARY OF THE INVENTION

The present invention has been devised in consideration of the above-mentioned problems, and, an object of the present invention is to provide an image formation apparatus, even requiring a reduced cost and a simple configuration, having a function of avoiding an occurrence of a problem which may otherwise occur on occasion of sudden operation of turning off of a power switch by a user or so, and a network system containing such image formation apparatuses.

For this purpose, the present invention includes a power switching part which starts and cuts off a power supply by an operation from the outside. Also provided there are an operation detection part which detects an operation of cutting off of the power supply on the power switching part, a backup device which performs a back-up operation by which a supply of electric power by a predetermined amount even after the normal power supply is thus cut off by the above-mentioned turning-off operation. When the cutting of the power supply is detected by the above-mentioned operation detection part, a function is performed by which predetermined data stored in a volatile storage device is saved to another part thanks to a power supply provided by the above-mentioned backup device.

Thereby, even in a case where the power supply to a machine is cut off by an unexpected turning-off operation of a power switch made by a user or so, it becomes possible to save necessary data. The above-mentioned backup device may be made by a simple configuration such as a merely power storage capacitor or so, and, thus, the necessary cost can be well controlled. Further, as the time required for performing the above-mentioned data saving operation with a power fed by the backup device is actually short, it is possible to accordingly shorten the time required for completely shutting down a power supply to a load such as a fixing device for a device protection purpose.

The information to be saved as mentioned above on occasion of power shut down may include information externally notifying that an operation interruption of a machine has occurred due to an operation of turning off a power switch made by a user or so; image formation process information such as page data produced on the way during an image formation process in the machine; operation counter information or lifetime information on a predetermined expendable/wear-out part such as a photoconductor or photosensitive drum, a fixing device or fixing heating roller or so, and so forth. By saving these types of information on an occasion of an interruption of machine operation, particularly in an operation environment of a communications network, it becomes possible for an external apparatus such as a host computer, etc. to positively notify the cause of this machine operation interruption, and, as a result, a proper management by a user or an operation staff on this matter can be attained quickly.

Moreover, by saving once produced image formation process information at an occasion of sudden machine operation interruption, the image formation operation can be continued after a recovery of this machine from the interruption, within a necessary minimum time, by utilizing the thus-saved information. Moreover, by saving the lifetime information on an expendable/wear-out part in the machine, a problem in that the lifetime information on a halfway counted state stored in a volatile storage device is lost by the unexpected machine operation interruption can be avoided, and, thus, the remaining-lifetime information can be provided at a high accuracy.

BRIEF DESCRIPTION OF THE DRAWINGS

Other objects and further features of the present invention will become more apparent from the following detailed description when read in conjunction with the following accompanying drawings.

DESCRIPTION OF THE PREFFERED EMBODIMENTS

Figure 1:
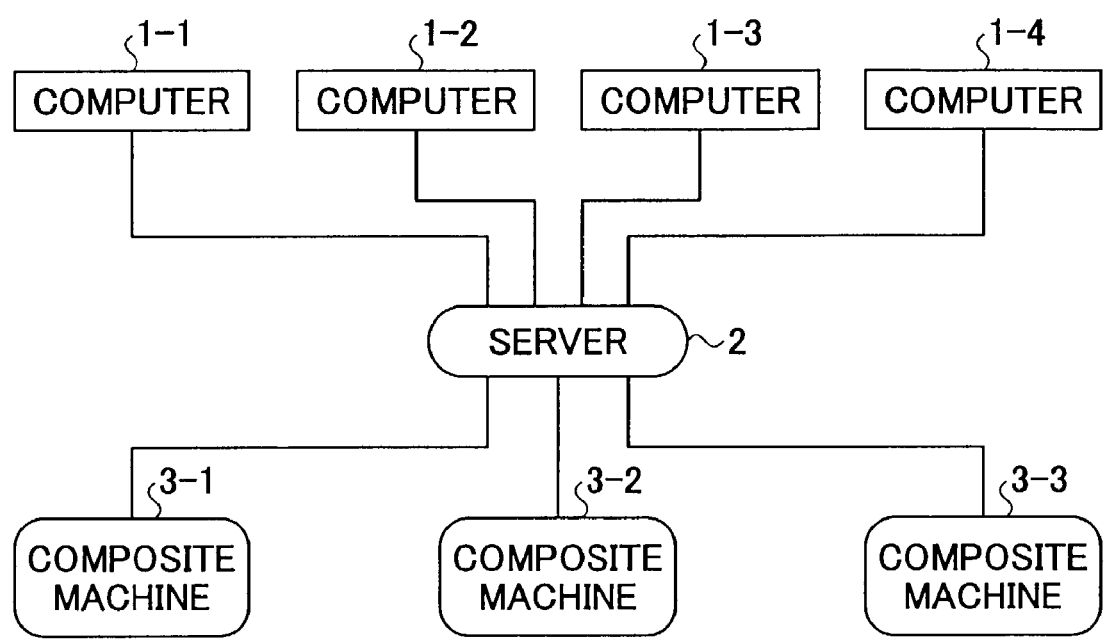
FIG. 1 shows a block diagram showing a configuration of a communications network system containing image formation apparatuses according to one embodiment of the present invention.

A preferred embodiment of the present invention will now be described with reference to the figures. FIG. 1 shows a general configuration of a communications network system according to a first embodiment of the present invention. There, provided are computers 1 (1-1, 1-2, 1-3, and 1-4) used by four users as input devices; a server 2 which acts as an interface device between these computers 1 and composite machines 3 (image formation apparatuses), and the composite machines 3 (3-1, 3-2, and 3-3) connected together electrically in a communications network. In this configuration, each of the users can carry out printing output operations of images by operation through the server 2 using each of the composite machines 3-1, 3-2, and 3-3. Each apparatus is mutually connected via so-called I/F cables there.

Figure 2:
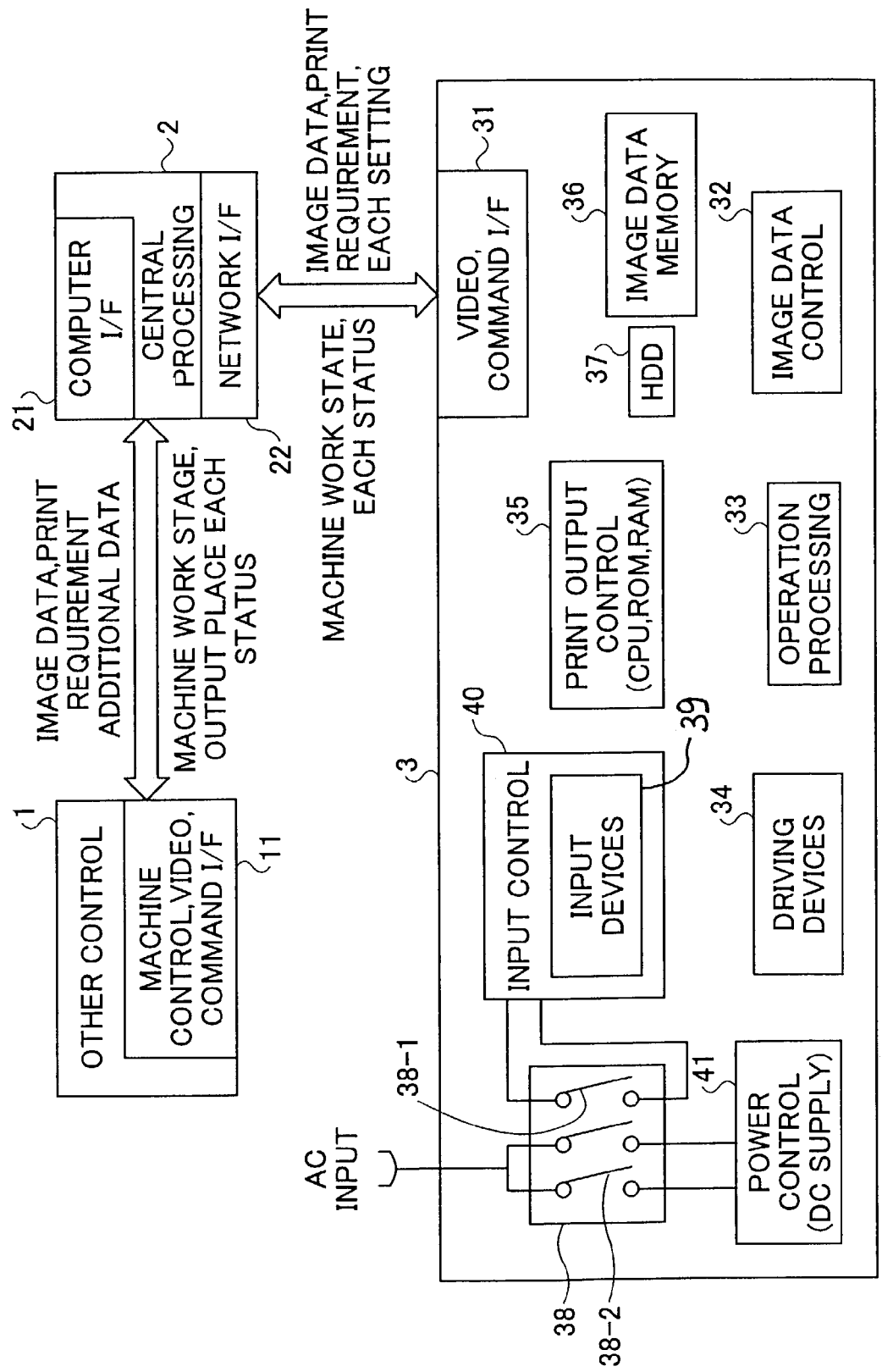
FIG. 2 shows a block diagram showing a configuration of each image formation apparatus as a composite machine, computers, and a server shown in FIG. 1.

FIG. 2 shows a functional block diagram of each apparatus of the above-mentioned network system. A video command I/F part 11 in a composite machine control unit connected with the server 2 is provided in each computer 1, and, also, the server 2 includes a computer I/F part 21 for the computers 1. In communications between these apparatuses, image data and several types of additional information such as printing requirements are transmitted to the server 2 from each computer 1. Protocols for execution of these operations are executed by driver software installed in each computer 1. These sorts of data are transmitted to each composite machine 3 through the server 2, especially, via a network I/F part 22 thereof.

In each composite machine 3, provided are a video command I/F part 31 connected with the server 2; an image data control part 32; an operation processing part 33; driving devices such as several types of motors 34; a printing control unit 34 including a CPU which controls whole of the machine, a ROM having control programs written therein, a PAM storing control data (including a DRAM and an NVRAM shown in FIG. 10), and so forth; a large-capacity memory 36 storing image data; a HDD (hard disk drive) 37; a power switch 38 for turning on/turning off a power supply to a power control device (DC supply) 41; an input control part 40 handling information coming from input devices such as sensors or so; the power control device 41 generating a DC power from an AC power (commercial power source); and so forth. Other than those, in each composite machine 3, a scanner, a scanner control device, etc. for reading draft images as inputs thereto, and also, an image formation mechanism including a photosensitive drum, a laser exposure unit, fixing device, and so forth, for printing out the thus-input image data (see FIG. 9) are provided.

By the function of each of the above-mentioned control parts, each composite machine 3 transmits information concerning operation situation of the composite machine 3 itself, status data such as a paper end notice, a toner end notice, and so forth to the server 2 even during a printing operation or a standby operation. The server 2 takes in these types of information in a memory in the server 2 itself for every arbitrary predetermined time interval, and holds the same therein. Furthermore, the server 2 has a function to transmit these types of information to each computer 1 in response to a requirement made by a user.

A power switch turning-off detection operation in each composite machine 3 will now be described. The power switch 38 has a first switch part 38-1 is connected with the input control part 40, and a second switch part 38-2 which couples the input AC power to the power control part 41. Further, a configuration is made in that a cutting (turning-off) state of the first switch part 38-1 is detected by the CPU of the printing control part 35 through the input control part 40.

Figure 3:
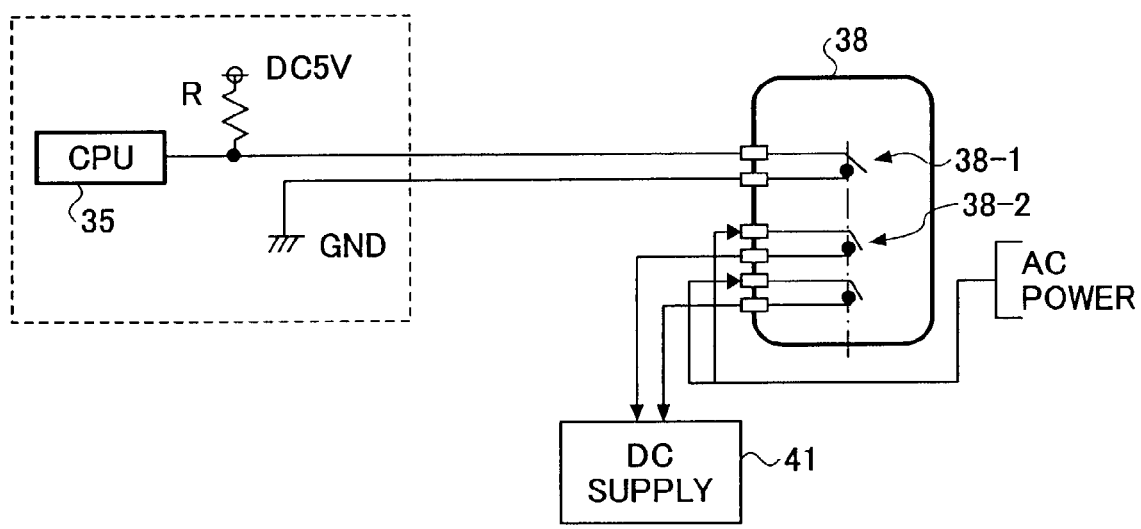
FIG. 3 shows a configuration around a power switch in the image formation apparatus shown in FIG. 2.
Figure 4A:
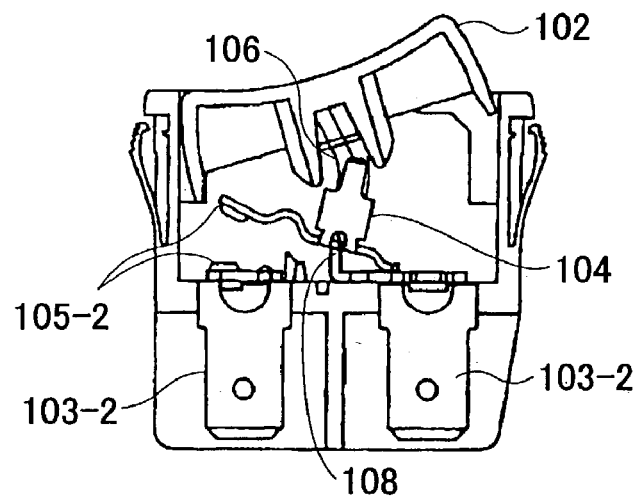
FIGS. 4A and 4B show elevational sectional views for illustrating a configuration of the power switch in the image formation apparatus shown in FIG. 2.
Figure 4B:
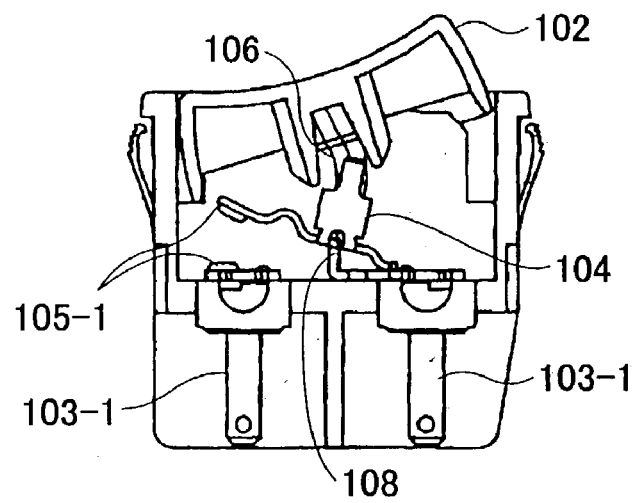

FIG. 3 illustrates a configuration for detecting this turning-off operation when cutting (turning-off) operation of the power switch 38 is made by a user, in the input control part 40 of the composite machine 3 shown in FIG. 2. FIGS. 4A and 4B show elevational sectional views of the power switch 38. FIG. 4A shows a portion for the above-mentioned switch part 38-2 for power supply, while FIG. 4B shows a portion for the above-mentioned switch part 38-1 for turning-on/turning-off operation detection.

As can be seen from FIGS. 3, 4A, 4B and 5, the power switch 38 includes the second switch part 38-2 for feeding a power to a motor which carries out a rotation drive of a photosensitive drum 1117 which will be described later with reference to FIG. 9, a power to charge the photosensitive drum, a power to heat a fixing roller in the fixing device, a control power, and so forth; and the first switch part 38-1 which operates together with the above-mentioned second switch part 38-2 and is connected with the input control part 40 for the purpose of the above-mentioned switch operation detection.

As shown in FIGS. 4A and 4B, the switch 38 includes respective electrical contacts 105-1 and 105-2 of the above-mentioned first and second switch parts 38-1 and 38-2, and respective terminal 103-1 and 103-2 for external connection connected to the fixed contacts of the above-mentioned electrical contacts. A movable member 104 to which the movable contacts of the above-mentioned electric contacts 105-1 and 105-2 are fixed is provided rotatably on a fulcrum 108. This movable member 104 is connected with a key 102 via a spring 106, which key is pressed by a user's finger as a turning-on/turning-off operation thereof.

In this configuration, the key 102, the spring 106, and the movable member 104 are common between the respective switch parts 38-1 and 38-2. When the key 102 is pressed by the user, in this response, the movable member 104 rotates clockwise/counterclockwise together with the movable member 104 which at the same time rotates in the opposite direction. The movable contacts of the contacts 105-1 and 105-2 fixed to the movable member 104 as a result rotate simultaneously, and, thereby, the respective switch parts 38-1 and 38-2 shown in FIGS. 2 and 3 operates, i.e., open/close their electric contacts simultaneously.

Figure 5:
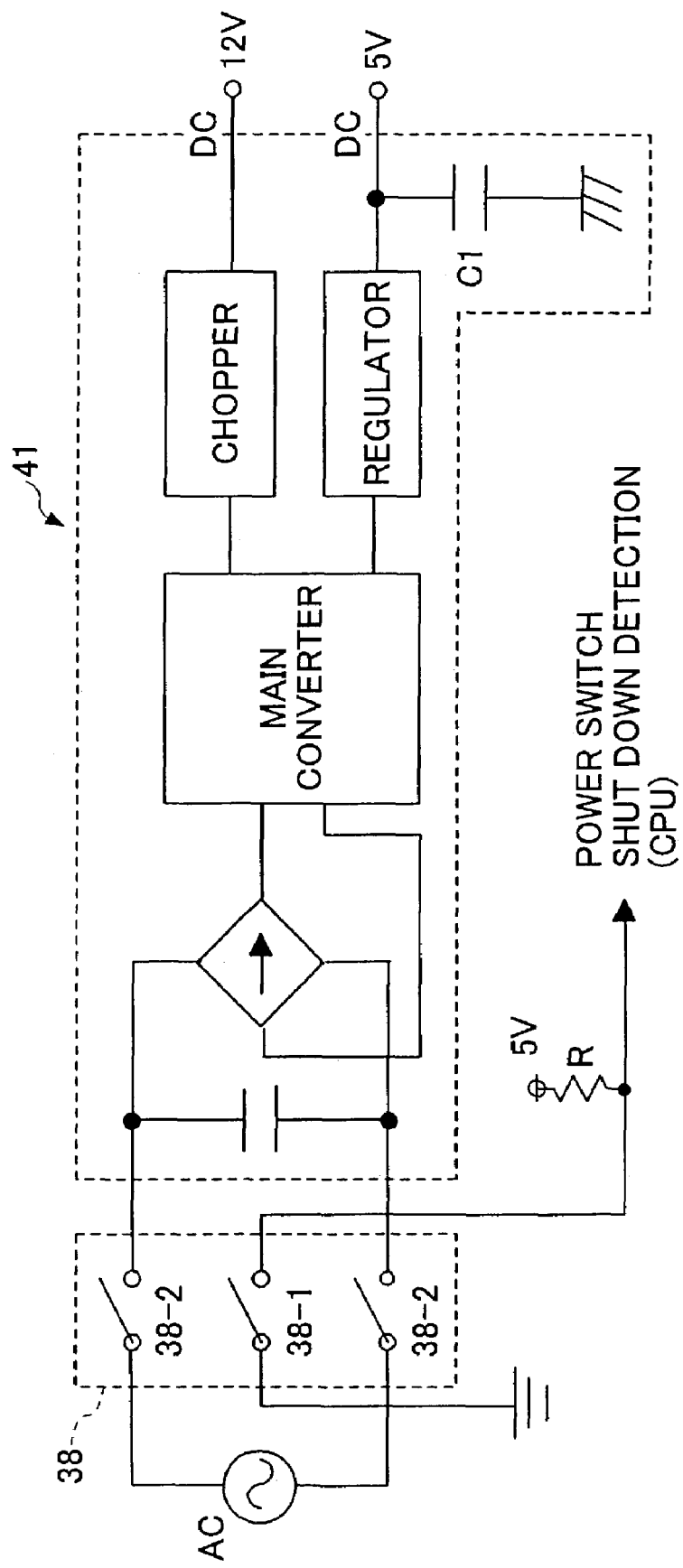
FIG. 5 shows a configuration of a DC power supply in the image formation apparatus shown in FIG. 2.

As shown in FIG. 3 and FIG. 5, the switch part 38-1 for operation detection is connected between a DC-5V power supply line and the ground fed by the DC power supply 41, and the switch part 38-2 for power supply is connected between the AC power supply line and the DC power supply 41. When a turning-off operation of the power switch 38 is carried out by a user, the AC power supply to the DC power supply 41 is cut off by the opening operation of the switch part 38-2 accordingly. Moreover, the line connected to the DC-5V power supply through a resistor R of the switch part 38-1 is simultaneously separated from the ground by this opening operation. As a result, this line comes to have an "H" level from a previous "L" level, and thereby, detection of "turning-off operation" is made by the CPU in the printing control part 35. Thus, the turning-off operation of the power switch 38 is detected.

The state of voltage drop of DC output of the DC power supply 41 occurring at a time of turning-off operation of the power switch 38 is shown in FIGS. 6A through 6D of a timing chart. While the AC power supply is supplied, a power of DC 24 V mainly used for the driving system in the machine and a power of DC 5 V used for the control system in the machine are kept at their respective normal voltages. Although cutting off of the AC power supply to the DC power supply 41 is performed on occasion of turning-off operation of the power switch 38 by a user, the voltage of DC 24 V and voltage of DC 5 V are kept while electric charges previously stored in capacitors (for example, a capacitor C1 of FIG. 5) contained in the DC power supply 41 or each control part are discharged therefrom.

Figure 6:
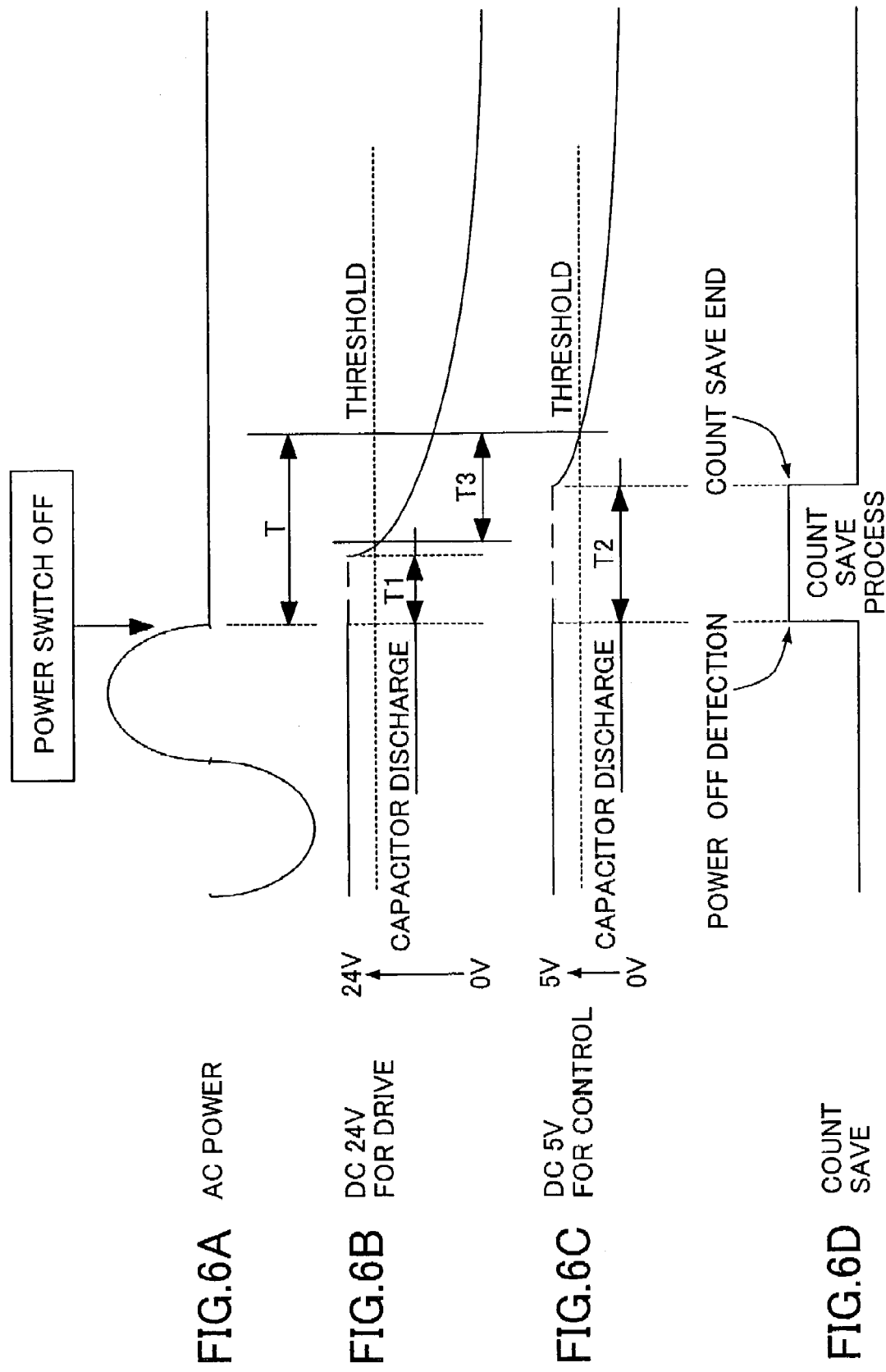
FIGS. 6A through 6D illustrate a time chart of temporally change in an output voltage of the DC power supply at a time of turning-off operation performed on the power switch in the image formation apparatus shown in FIG. 2.

Namely, as shown in FIG. 6B, the power of DC 24 V is kept for a time interval of T1, while, as shown in FIG. 6C, the power of DC 5 V is kept for a time interval of T2. The specific values of the time intervals T1 and T2 are determined according to actual capacitance values of the power storage capacitors, and actual values of load power consumptions. After the electric discharge from these capacitors is completed, as shown in the figures, a voltage drop occurs gradually as shown. After that, these voltages reach respective thresholds at which the drive system such as various motors, and so forth become not able to operate properly, or the control system such as the CPU become not able to operate properly.

A difference in time taken for the DC power supply for the respective drive system and control system to fall to their thresholds is indicated as a time interval T3 shown in FIGS. 6B and 6C. Therefore, it is necessary to detect a turning-off operation of the power switch 38 during this interval T3, and, if such detection could not be achieved properly, an unnecessary detection of abnormal state would be made.

According to the configuration of the present embodiment of the present invention, a predetermined finish process to be performed on occasion of sudden power shut down is performed such a process of avoiding such an unnecessary detection of abnormal state, a process of protecting the HDD in the machine as will be described later, or so, during the time interval T between the time the power switch turning off operation is performed and the time the DC 5 V power for the control system drops to its threshold. Actually, as will be described with reference to FIGS. 7A through 7C, a certain time delay $\Delta t$ occurs, and, thus, this time delay should be subtracted from the above-mentioned time period so that the actually utilizable time interval is obtained.

In the example shown in FIGS. 6A through 6D, during the time interval T2 within the time interval T until the power of DC 5 V for the control system falls to the threshold after a detection of turning off of the power switch 38, count data (cumulative working amount data) on an expendable/wear-out part such as the photosensitive drum and so forth as will be described later is saved into a non-volatile storage device (see FIG. 6D).

Figure 7:
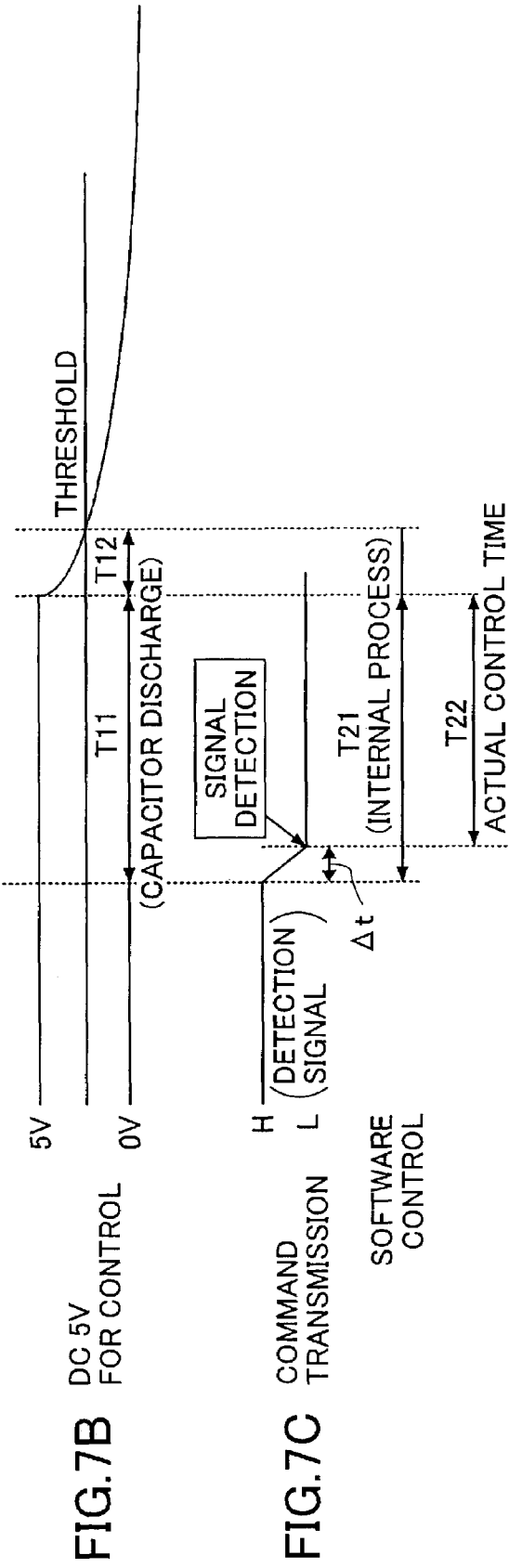
FIGS. 7A through 7C illustrate a time chart of a timing of data transmission processing toward a host computer performed when a turning-off operation of the power switch is performed in the image formation apparatus shown in FIG. 2.

FIGS. 7A through 7C illustrate a timing chart of predetermined command transmission processing of a control part in the machine performed upon an event of a drop of the DC power supply voltage caused by a turning-off operation of the power switch 38, through the above-mentioned operation of detection of the turning-off, operation. In this example shown, the supply of AC power is interrupted due to the turning-off operation of the power switch 38 in the composite machine 3, and the composite machine 3 detects the above-mentioned signal (see FIG. 3) which shows the turning-off operation with some time delay Δt. A predetermined internal processing in the composite machine 3 is performed in the meantime (T21 period). Since the time which can be used for this internal processing includes the time delay Δt mentioned above, the above-mentioned internal processing should be performed within the time interval T22 obtained from subtraction thereof.

In the DC power supply 41, as described above, the DC-5V power supply is kept for a time interval T11 by an amount of electric charge previously stored in the capacitor C1 (see FIG. 7B). Then, when the stored electric charge has been consumed off, the voltage starts to drop. When a T12 time interval elapses, it becomes not possible to perform a proper control operation in the CPU of the printing control part 35, and thus, it becomes not possible to perform proper control in the composite machine 3, especially, command transmission to the server 2, etc. due to this control voltage drop. Therefore, in the present embodiment, as shown in FIGS. 7A through 7C, a setup is made on the time required for the control operation and the capacitor's electric charge capacity in a manner such that the time interval T22 required for the above-mentioned predetermined internal processing becomes positively shorter than the period of (T11+T12) in which the control voltage falls, i.e., T22<T11+T12.

Figure 8:
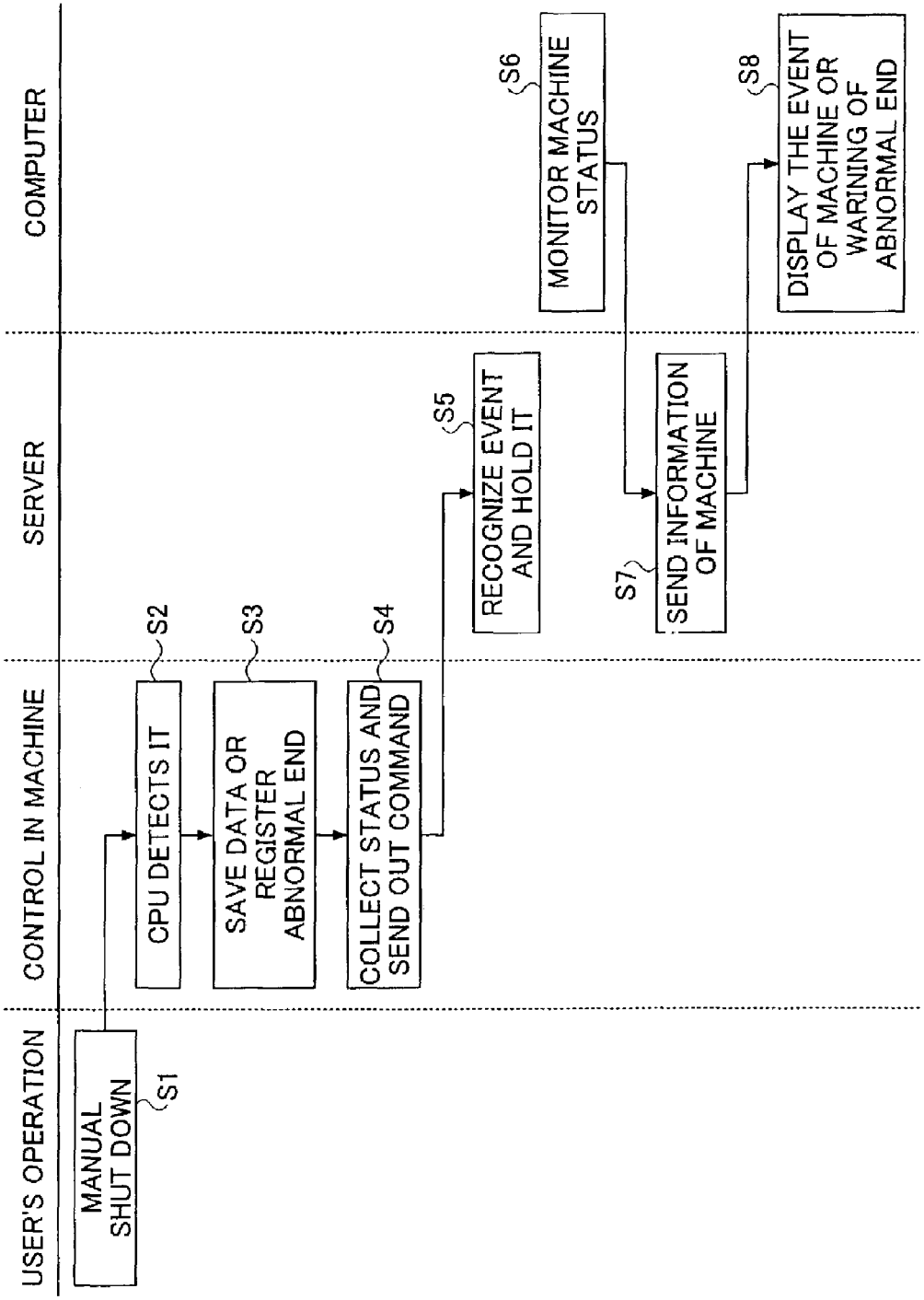
FIG. 8 shows an operation flow chart of data transmission processing toward the host computer performed when a turning-off operation of the power switch is carried out in the image formation apparatus shown in FIG. 2.

FIG. 8 is a flow chart of the above-mentioned corresponding control performed at a time of power supply turning-off operation. When a user performs a turning-off operation on the power switch 38 upon running of the composite machine 3 (in a step S1), in the composite machine 3, the AC supply to the DC power supply 41 stops, and the CPU detects the turning-off operation of the power switch 38 through the input control part 40 as mentioned above (in a step S2). The printing control part 35 writes and save information stored in each memory under work into a non-volatilized memory which can maintain the storage contents thereof even after the power supply thereto is interrupted as well known (in a step S3). When the machine is performing a copy operation, a printing operation, or so at this time, this event (sudden operation interruption) is registered into a predetermined memory at the same time with the above-mentioned backup power supply from the capacitors. Then, the composite machine 3 further collects information, such as that indicating each item of operation status in the machine, and, then, notifies the event of power supply turning-off in the machine to the server 2 together with the thus-collected information (in a step S4). The above-mentioned predetermined internal operation includes the operations of the steps S2 through S4 described above.

The server 2 receives the above-mentioned transmission data from the composite machine via the communications network, and thus, recognizers that the composite machine 3 suffers a power failure, and holds this information (in a step S5). After that, upon user's access to the server 2 for the purpose of monitoring the work situation of the composite machine 3 via a driver software of the computer 1 (in a step S6), the server 2 returns the information indicating that the composite machine 3 is in the power failure situation through execution of a predetermined protocol (in a step S7).

Thereby, the computer 1 displays that event in that the composite machine 3 is in the power supply failure situation via its monitor screen with the thus-returned information (Step S8). In that case, in case the power failure occurred in the midway of printing operation or copy operation in the composite machine 3, such a sudden interruption situation is displayed with a warning alarm. Thus, according to the present embodiment, in the communications network system, the power supply failure event notification information on the composite machine 3 can be taken therefrom, it can be displayed on the computer 1 after it is transferred via the network, and, thus, the user can exactly understand the event actually occurring in the relevant composite machine 3.

Thus, according to the present embodiment, the fact that turning-off operation of the power switch has been made during an operation can be positively reported to the host computer on the network system, before it becomes not possible due to a power failure that the control circuit in the corresponding image formation apparatus or composite machine operates properly. Moreover, via each computer, a user can recognize, without the necessity of actually going to the image formation apparatus, that the relevant image formation apparatus is out of use, as a result of the event is displayed on the monitor screen of the computer 1 through the driver software.

Furthermore, since a warning indication of that is given through the driver software of the computer when there is an image formation apparatus which suffers a power failure before the completion of its own work as mentioned above, the user can recognize, without actually going there, that an expected printed matter is incomplete due to such a sudden interruption.

Figure 9:
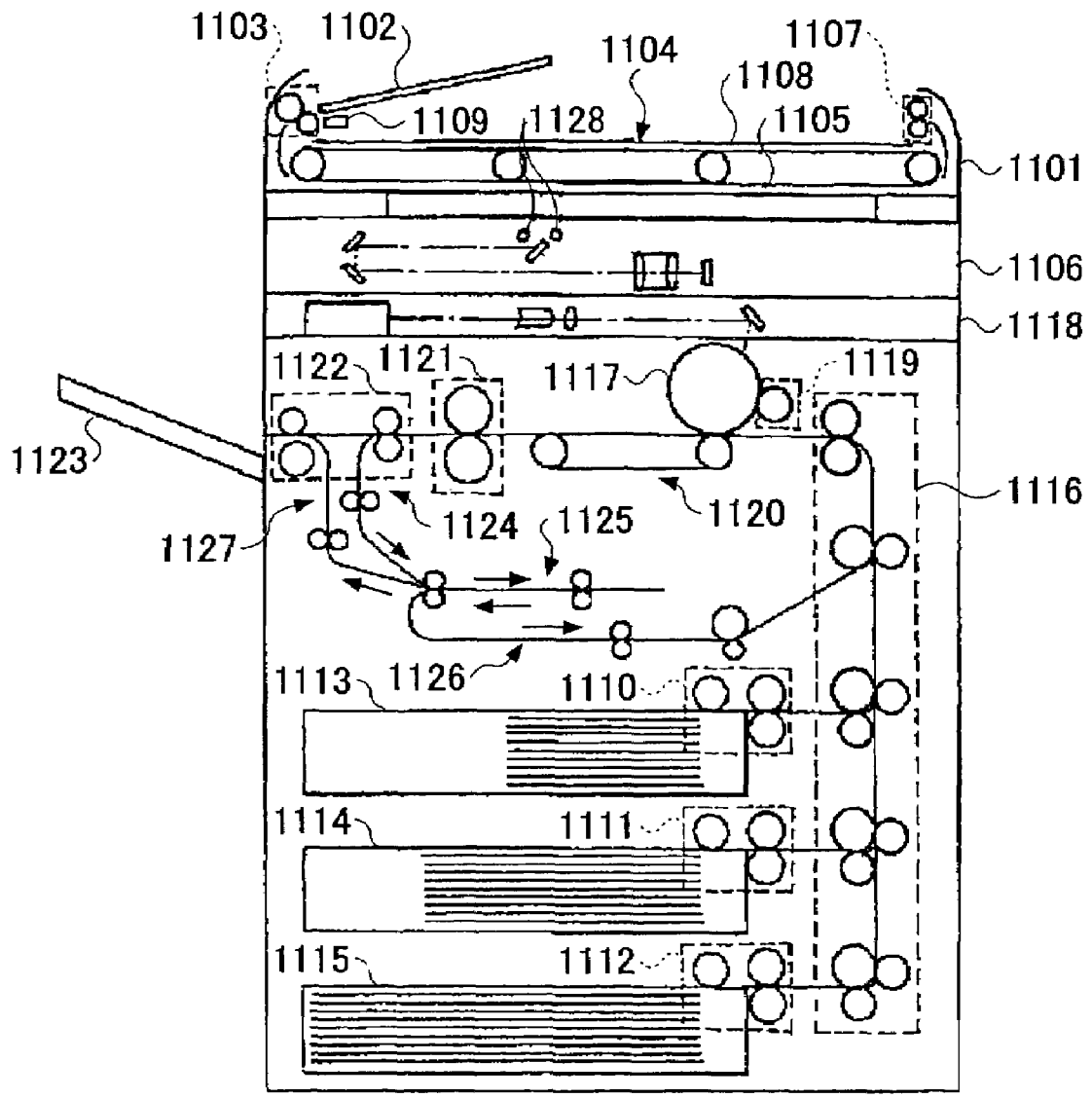
FIG. 9 shows an elevational sectional view of a configuration particularly performing an image formation process in the image formation apparatus shown in FIG. 2.

FIG. 9 shows an elevational sectional view of an internal configuration of the image formation apparatus in each of the above-mentioned composite machines 3. In this configuration, upon a detection of originals (papers) on an original tray 1102 in an original placement detector 1109, a predetermined position on a contact glass 1105 is fed with the original from the bottom on the original tray 1102 with a feed roller 1103 and a feed belt 1104. The original on this contact glass 1105 is ejected onto a delivery stand 1108 with the feed belt 1104 and an ejection roller 1107, after image information is read from the original by an image reading device 1106. The feed roller 1103, the feed belt 1104, and the ejection roller 1107 are driven by a conveyance motor not shown.

A first feeding device 1110, a second feeding device 1111, or a third feeding device 1112 uses a transfer paper previously loaded into a first tray 1113, a second tray 1114, or a third tray 1115 for feeding the same as an image transfer material to a position at which it contacts the photosensitive drum 1117 which acts as an image carrying member by a conveyance unit 1116. The photosensitive drum 1117 acting as a photoconductor is rotated at a uniform velocity by a predetermined main motor.

Generally, a lifetime of the above-mentioned photosensitive drum 1117 is shorter than the same in other devices, and the lifetime of the photosensitive drum 1117 is determined by a cumulative number of rotations or cumulative rotation time period thereof. Then, when the predetermined permissible number of rotations or rotation time is reached, it should be replaced with a new one.

The image data read from the original with the image reading device 1106 is processed by an image-processing device not shown, and thus, it is transformed into optical information by a writing unit 1118. Then, after the above-mentioned photosensitive drum 1117 is uniformly charged with an electrification device not shown, the optical information is used to form an electrostatic latent image on the photosensitive drum 1117 through the writing unit 1118. The electrostatic latent image on the photosensitive drum 1117 is developed by a development device 1119, and thus, is visualized into a toner image.

A conveyance belt 1120 is used both as a paper conveyance unit and as an image transfer unit, and a transfer bias is applied thereto from a power supply. Then, the conveyance belt 1120 causes the transfer paper fed from the conveyance unit 1116 to have the toner image transferred thereonto from the photosensitive drum 1117, while conveying the transfer paper at a same speed as that of the photosensitive drum 1117. Then, the toner image thus transferred onto the transfer paper is fixed by a fixing device 1121 by a heat and a compression force therein, and this transfer paper thus forming a printed matter is ejected into a delivery tray 1123 by a delivery unit 1122.

In the image formation apparatus having the above-described configuration, the photosensitive drum 1117, a fixing roller of the fixing device 1121, etc. are expendable/wear-out parts which should be replaced after being used for a predetermined amount of time or a predetermined operation amount. Specifically, as mentioned above, as to the photosensitive drum 1117, the cumulative amount of operation is managed in a form of the cumulative number of times of rotations, or the like. Then, when it reaches a predetermined number of times of rotations, the part should be exchanged by a new article. For this purpose, respective counters realized in a memory as respective count values are provided for these expendable/wear-out parts, each of which operates upon an operation of the relevant part.

Figure 10:
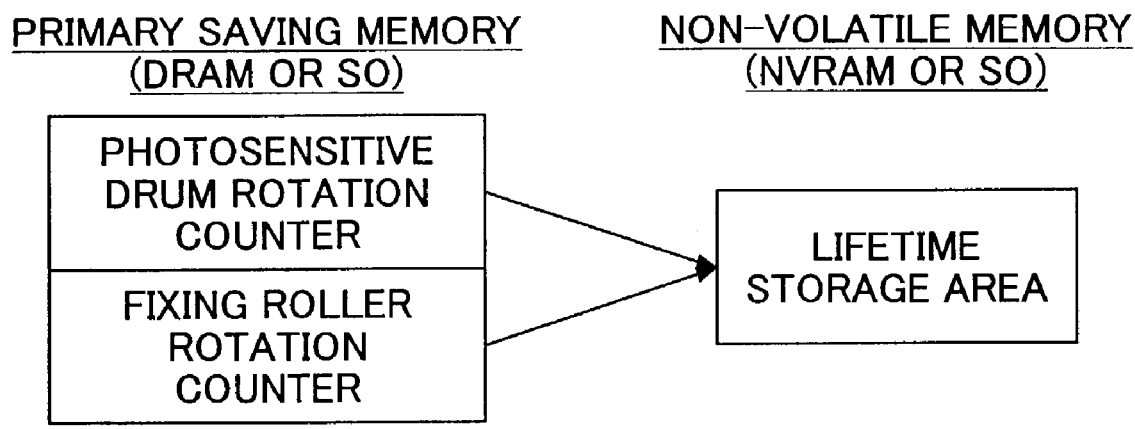
FIG. 10 illustrates a way of storage or updating of information indicating a cumulative amount of operation or lifetime information of an expendable/wear-out part such as a photosensitive drum or so in the image formation apparatus shown in FIG. 2.

In the image formation apparatus as each of the composite machines 3 in the present embodiment, the count value of each of the above-mentioned counters is stored in a non-volatilized memory, such as an NVRAM (non-volatile RAM), so that it may not be lost, even when the power supply to the machine is cut off. However, if the count value in the NVRAM is overwritten every rotation of the photosensitive drum 1117 for example, as the overwriting process takes a time, a problem may occur in that a timing error/delay occurs with other items of control processes. For the purpose of solving this problem, according to the present embodiment, as shown in FIG. 10, during an operation, renewal of each count value is performed on a volatile memory such as a DRAM for which a time required for rewriting is short, and, after a predetermined series of operation of the relevant expandable/wear-out part, or in an interval in which other control operations are not busy, the count value in the volatile memory is used for rewriting the corresponding value in the NVRAM.

In this configuration, when the power supply to the machine is interrupted by a turning-off operation made by a user on the power switch 38 in the image formation apparatus as mentioned above, the above-mentioned processing of writing the count value stored in the volatile memory (primary saving memory shown in FIG. 10) into the non-volatility memory, such as NVRAM is performed while the above-mentioned backup device (capacitor C1) keeps a power supply thereto as described above with reference to FIG. 6D. Specifically, as described above, after a detection of the turning-off operation of the power switch made by the user through the function of the switch part 38-1 for operation detection of the power switch 38, the power supply for the control system is fed by a discharge of the electric charge previously stored in the capacitor C1 (see FIG. 5) acting as a backup device as mentioned above. During this time period T2 (see FIG. 6C) until the power supply voltage drops due to a completion of the discharge and thus operation of each control part in th machine becomes impossible, the above-mentioned processing of updating the count value in the NVRAM with the current value in the volatile memory (count saving processing) is performed.

Consequently, the count value which shows the cumulative amount of operation of the expendable/wear-out parts such as the photosensitive drum 1117 is saved surely, and is updated appropriately. Therefore, degradation in accuracy of the count value or lifetime information due to a power failure caused by a turning-off operation of the power switch can be avoided, which count value indicates an occasion in which the relevant expandable/wear-out part should be replaced with a new one. The above-mentioned primary saving memory (DRAM or so) and the non-volatile memory (NVRAM or so) shown in FIG. 10 are included in the printing control part 35 in the configuration of the composite machine 3 shown in FIG. 2 for example.

Then, by a predetermined operation of a user or a service staff performed at any time, the above-mentioned lifetime information, i.e., data indicating the cumulative operation time stored in the non-volatile memory such as an NVRAM is displayed on an operation screen of the composite machine 3 concerned. Further, after being transmitted therefrom to a storage device in the server 2, such information is displayed on a monitor of the computer 1 through a function of the predetermined driver software thereof. Then, after viewing this information, a service staff or so replaces the corresponding expandable/wear-out part by a new article, when this data indicates that the predetermined cumulative operation value at which the relevant part should be replaced has been reached.

Image data, system information, font data, etc. are stored in the HDD 37 of the composite machine 3 shown in FIG. 2. In this HDD 37, when the power supply is interrupted during an access operation such as writing of data thereto, or reading data therefrom, controlling will become impossible, a magnetic head of the HDD thus may collide with a recording area of a magnetic disk (a crash) at a worst case, and also, there is a possibility that data stored in the disk is destroyed. Thus, when a turning-off operation of the power switch 38 made by a user causes an interruption of a power supply to each control part of the machine, especially such a power supply turning-off operation which another user does not expect causes an interruption of power supply to the machine, a proper data writing or reading may not be performed in the HDD 37, or, a serious failure may occur in the same.

In order to solve this problem, a configuration is preferably provided further in the above-mentioned embodiment of the present invention such that, even after a turning-off operation is made on the power switch 38, a power is supplied to the printing control part 37 and also to the built-in hard disk drive (HDD) 37, for a predetermined period. That is, when the power supply is interrupted during a printing operation performed in the composite machine 3 for example; a power supply is maintained thanks to the above-mentioned function of power supply backup by the capacitor C1 (see FIG. 5) for the hard disk drive 37, thereby the data stored therein being able to be positively saved. Further, simultaneously, also thanks to the function of power supply backup, another saving operation is preferably performed in that, for example, a predetermined working part such as a magnetic head or a head arm of the HDD is made positively apart from the recording surface of the magnetic disk, etc so as to avoid a crash accident.

Thus, in such a preferable configuration, when the power switch 38 is turned off by a user, the power supply to the printing control part 35 and HDD 37 from the DC power supply (power control part) 41 is cut off, a switching is made such that a power supply from the above-mentioned capacitor C1 acting as the power supply backup device is started instead.

Figure 11:
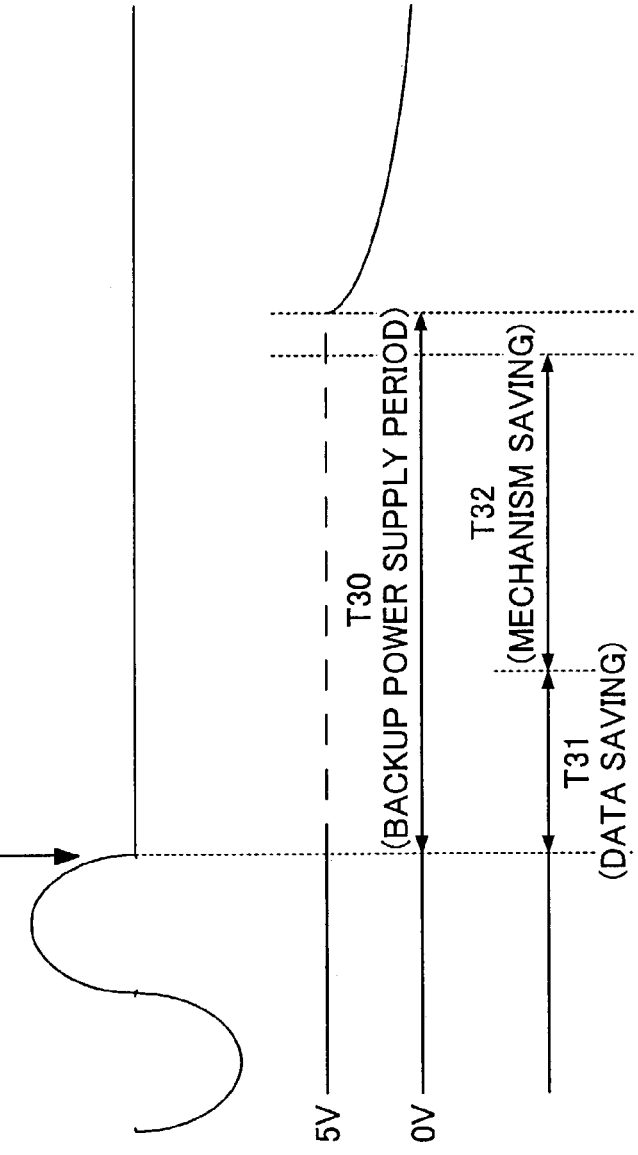
FIGS. 11A through 11C illustrate a time chart of a timing of a hard-disk-drive protection operation performed when a turning-off operation of the power switch is carried out in a preferable configuration of the image formation apparatus shown in FIG. 2.

FIGS. 11A through 11C show a timing chart of a supply of backup power and HDD protection process according to the above-described preferable configuration of the above-mentioned embodiment of the present invention. As shown in these figures, upon a turning-off operation of the power switch 38 made by a user, a supply of AC power to the DC power supply 41 is interrupted, and a switching of power supply source is made automatically into a power supply from the capacitor C1 as the power supply backup device. Then, the composite machine 3 detects a signal which indicates the power supply turning-off operation with a some delay as mentioned above (from the switch part 38-1 as shown in FIG. 3 or 5), and thereby, the control operation can be continued during a time period T30 (see FIG. 11B) while an electric power is fed by the capacitor C1 as the power supply backup device.

The CPU in the printing control part 35 then completes a relevant predetermined protection process during a time period T31 required for saving internal data of the HDD 37 externally and during a period T32 required for moving predetermined working parts such as the magnetic head of the HDD 37 to the place of safety. Thus, in this preferable configuration, the above-mentioned period T30 which can be utilized should be longer than the required periods T31 and T32, i.e., T30 >T31+T32. For this purpose, the capacity of the capacitor C1 as the power supply backup device to be provided should be previously set large enough.

Figure 12:
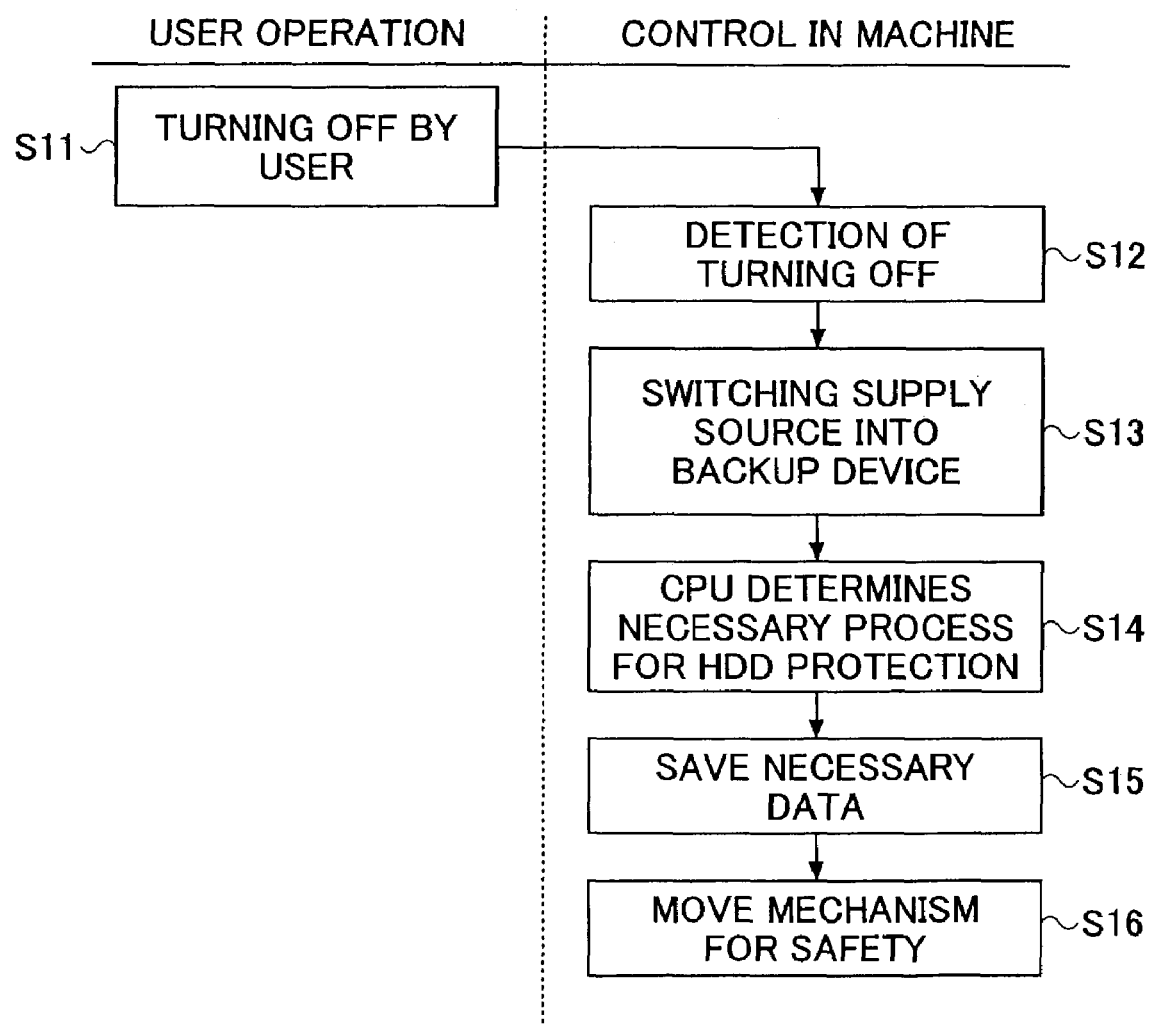
FIG. 12 shows a flow chart of the processing of hard-disk-drive protection operation performed when a turning-off operation of the power switch is carried out in the image formation apparatus shown in FIG. 2.

The correspondence control flow for an occasion of power supply interception will now be described for the above-described preferable configuration. FIG. 12 shows the correspondence control flow performed in the above-described preferable configuration of the composite machine 3 in an occasion of the above-mentioned power supply interruption, i.e., a turning-off operation made by a user on the power switch 38.

When a user performs a turning-off operation on the power switch 38 while the composite machine 3 performs an operation (in a step S11), the AC supply to the DC power supply (power control part) 41 is cut off accordingly, and the CPU in the printing control part 35 detects the above-mentioned turning-off operation in the power switch 38 as mentioned above-mentioned through the input control part 40 (in a step S12). Then, a switching is performed automatically such that a backup electric power is started being supplied from the capacitor C1 as the power supply backup device to the printing control part 35 including the CPU, and so forth, and also, to the HDD 37 (in a step S13).

In this regard, there is no necessity of providing a some special power supply source changeover switch or so for this purpose. Namely, in the circuit configuration of FIG. 5, the electric power supply to the DC power supply 40 is cut off due to the opening operation of the switch part 38-2 for power supply. Then, after the output terminal voltage of the power supply 40 drops as a result, an electric charge previously stored in the capacitor C1 is automatically will discharged to maintain the output terminal, the electric power for backup is thus automatically supplied from the capacitor C1, and the DC voltage of the terminal concerned is maintained.

Then, when the opening operation of the switch part 38-1 for operation detection shown in FIG. 3 or 5 results in a detection of the turning-off operation of the power switch 38 by the CPU, the CPU determines what type of saving operation should be applied after determining whether or not the HDD 37 is currently performing a writing/reading operation (in a step S14). According to the determination result, data stored in the HDD 37 to be saved is saved to the server 2 through data transmission on the network shown in FIG. 1 (in a step S15). Further, the working parts in the HDD 37 such as the head arm and so forth which may otherwise cause a serious accident such as a head crash are moved to a place of safety (in a step S16). These sorts of processing are executable thanks to the backup electric power provided by the above-mentioned backup device.

Thus, in the above-mentioned preferable configuration, even when the HDD 37 built in the composite machine 3 lapses into an unexpected power supply failure situation, a possible fault, such as a damage of data stored in the HDD 37, or so, is positively avoided. That is, on an occasion of power supply failure in the machine due to a power shut-down operation in the image formation apparatus, this operation is detected, a backup electric power is fed by the power supply backup device made of a capacitor or so, and a power supply is kept for the predetermined functional parts for a while. Thereby, predetermined preparation works necessary at such a time of power supply failure can be performed on these functional parts. Moreover, thanks to an electric power supplied from the power supply backup device, it becomes possible to perform predetermined protection processing even on an occasion of power shut-down failure to the HDD, and, thus, data writing/reading failure in the HDD and other possible troubles in the same can be positively avoided.

Thus, according to the present invention, even when a main power supply failure occurs in the machine due to a turning-off operation on the power switch by a user, the simple backup device can cope therewith, i.e., an electric power supply to a predetermined part in the machine is maintained for a predetermined time period. During the time period, predetermined data is positively saved, a notice reporting that a power supply turning-off operation causes the machine to stop to the outside, and, also, a hard disk drive, etc. is safely stopped. Consequently, even when a sudden power supply turning-off operation by a user occurs, serious problems are prevented from occurring with a comparatively simple configuration. Furthermore, since such processing to be performed in response to an occasion of power supply shut down actually requires a very short period of time, a requirement in that a power shut down should be achieved immediately on occasion of a malfunction in the machine or so can also be almost satisfied.

Further, the present invention is not limited to the above-described embodiments, and variations and modifications may be made without departing from the basic concept of the present invention.

The present application is based on Japanese priority applications Nos. 2002-113950, 2002-172123 and 2003-100747, filed on Apr. 16, 2002, Jun. 12, 2002 and Apr. 3, 2003, the entire contents of which are hereby incorporated by reference.

What is claimed is:

1. An image formation apparatus comprising:
a power switching device configured to supply and cut off power in response to an external operation performed by a user;
an operation detecting part detecting the operation of said power switching device;
a power storage backup device which supplies backup power after the power switching device has cut off the power supply; and
a control unit which, upon detection of the operation of cutting off power by said operation detecting part, while said power storage backup device supplies backup power, saves predetermined data stored in a volatile storage device in said apparatus externally via a network,
wherein the operation detecting part is configured to detect the operation of said power switching device during an interval between a time of turning-off operation via the power switching device and a time at which a voltage supplied to a motor in the image forming apparatus is below a threshold required to operate the motor.

2. A network system comprising a plurality of computers, and also, the image formation apparatus claimed in claim 1, wherein:
a configuration is made in said network system in that when a predetermined computer of said plurality of computers receives the predetermined data from the image formation apparatus, said predetermined computer transmits the information of cutting of power in the image formation apparatus to another computer on the network.

3. The network system as claimed in claim 2, wherein a configuration is made in said network system in that, when the power is cut off during a predetermined image forming operation performed in the image formation apparatus, information indicating this matter is transmitted to a computer on the network.

4. An image formation apparatus comprising;
a power switching device configured to supply and cut off power in response to an external operation performed by a user;
an operation detecting part detecting the operation of said power switching device;
a power storage backup device which supplies backup power after the power switching device has cut off the power supply; and
a control unit which, upon detection of the operation of cutting off power by said operation detecting part, while said power storage backup device supplies backup power, saves predetermined data stored in a volatile storage device in said apparatus into a non-volatile storage device,
wherein the operation detecting part is configured to detect the operation of said power switching device during an interval between a time of turning-off operation via the power switching device and a time at which a voltage supplied to a motor in the image forming apparatus is below a threshold required to operate the motor.

5. The image formation apparatus as claimed in claim 1, wherein:
the predetermined data to be saved on the occasion of cutting off power comprises information indicating the event of the power being cut off.

6. The image formation apparatus as claimed in claim 4, wherein:
the predetermined data to be saved on the occasion of power being cut off comprises information indicating the event of the power being cut off.

7. The network system as claimed in claim 2, wherein:
the predetermined data to be saved on the occasion of power being cut off in the image formation apparatus comprises information indicating the event of the power being cut off in said image formation apparatus.

8. The image formation apparatus as claimed in claim 1, wherein:
the predetermined data to be saved on the occasion of power being cut off comprises image forming process information produced during an image forming process performed in said image formation apparatus.

9. The image formation apparatus as claimed in claim 4, wherein:
the predetermined data to be saved on the occasion of power being cut off comprises image forming process information produced during an image forming process performed in said image formation apparatus.

10. The network system as claimed in claim 2, wherein:
the predetermined data to be saved on the occasion of power being cut off in the image formation apparatus comprises image forming process information produced during an image forming process performed in said image formation apparatus.

11. The image formation apparatus as claimed in claim 1, wherein:
the predetermined data to be saved on the occasion of power being cut off comprises lifetime information indicating a remaining lifetime of a predetermined expandable/wear-out part of said apparatus.

12. The image formation apparatus as claimed in claim 4, wherein:
the predetermined data to be saved on the occasion of power being cut off comprises lifetime information indicating a remaining lifetime of a predetermined expandable/wear-out part of said apparatus.

13. The network system as claimed in claim 2, wherein:
the predetermined data to be saved on the occasion of power being cut off in the image formation apparatus comprises lifetime information indicating a remaining lifetime of a predetermined expandable/wear-out part of said apparatus.

* * * * *